(12) United States Patent
Gmelin

(10) Patent No.: US 6,431,151 B1
(45) Date of Patent: Aug. 13, 2002

(54) FUEL INJECTION SYSTEM

(75) Inventor: Karl Gmelin, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,858

(22) PCT Filed: May 6, 1998

(86) PCT No.: PCT/DE98/01246

§ 371 (c)(1),
(2), (4) Date: Jan. 13, 2000

(87) PCT Pub. No.: WO99/00595

PCT Pub. Date: Jan. 7, 1999

(30) Foreign Application Priority Data

Jun. 25, 1997 (DE) .......................................... 197 26 990
Aug. 16, 1997 (DE) .......................................... 197 35 665

(51) Int. Cl.$^7$ .............................................. F02M 37/04
(52) U.S. Cl. ...................................... 123/470; 123/468
(58) Field of Search ................................ 123/470, 468, 123/469, 472, 456, 509

(56) References Cited

U.S. PATENT DOCUMENTS

| | | | |
|---|---|---|---|
| 4,143,625 A | * 3/1979 | Kulke ........................ | 123/470 |
| 4,295,452 A | * 10/1981 | Lembke et al. .............. | 123/470 |
| 5,038,738 A | * 8/1991 | Hafner et al. ................ | 123/470 |
| 5,718,205 A | * 2/1998 | Jo ............................... | 123/470 |
| 5,752,487 A | * 5/1998 | Harrell et al. ............... | 123/470 |
| 5,771,863 A | * 6/1998 | Daly ........................... | 123/456 |
| 5,819,708 A | * 10/1998 | Buratti et al. ............... | 123/468 |

* cited by examiner

Primary Examiner—Carl S. Miller
(74) Attorney, Agent, or Firm—Kenyon & Kenyon

(57) ABSTRACT

A fuel injection system for direct injection of fuels into at least one combustion chamber of an internal combustion engine has at least one fuel injection valve for each combustion chamber which can be inserted at a spray section into a respective receptacle bore hole, which is designed on the cylinder head of the internal combustion engine and has a fuel inlet opening on an inlet section. This fuel injection system also has a fuel distributor line which has a fuel outlet opening for each fuel injection valve which can be connected to the fuel inlet opening of the fuel injection valve. A tubular transition piece is arranged between the fuel inlet opening of each fuel injection valve and the respective fuel outlet opening and can be snarlingly connected to the fuel inlet opening of the respective fuel injection valve and to the fuel outlet opening of the fuel distributor line so that it can move within predetermined limits.

12 Claims, 4 Drawing Sheets

FUEL INJECTION SYSTEM

FIELD OF THE INVENTION

The present invention relates to a fuel injection system for direct injection of fuel into the combustion chamber (or chambers) of an internal combustion engine.

BACKGROUND INFORMATION

It is described in Japanese Patent Application No. 02312503 that for each combustion chamber of an internal combustion engine, receptacle bore holes for a fuel injection valve can be provided on the cylinder head of the internal combustion engine, so that a spray section of the respective fuel injection valve can be inserted into these bore holes for direct injection of fuel into the respective combustion chamber. The fuel injection valve inserted into the receptacle bore hole in the cylinder head is held down against the relatively high combustion pressure prevailing in the combustion chamber by a hold-down device designed as a clamping claw. To reliably secure the fuel injection valves in the receptacle bore holes, relatively high hold-down forces must be exerted by the clamping claws on the fuel injection valves so that the fuel injection valves will sit relatively securely and immovably in the receptacle bore holes. For the supply of fuel to an inlet section provided on each fuel injection valve with a fuel inlet opening, Japanese Patent Application No. 08-312503 provides for the use of a fuel distributor line connecting the fuel injection valves to a fuel pump. For each fuel injection valve, the fuel distributor line has a receptacle element into which the inlet section of the fuel injection valve can be inserted, so the receptacle element surrounds the inlet section like a cup. To achieve the required seal, the inlet section of each fuel injection valve has a sealing element in the form of an O ring which is in sealing contact with the inside wall of the receptacle element.

Because of the relatively high combustion pressure in each combustion chamber of the internal combustion engine, the hold-down device must exert a relatively high hold-down force to securely lock the fuel injection valves in their respective receptacle bore holes on the cylinder head. However, the resulting rigid attachment of the fuel injection valves on the cylinder head makes it difficult to assemble the fuel distributor line, because there are deviations in position and angle between the inlet sections of the fuel injection valves and the receptacle elements of the fuel distributor line due to the manufacturing tolerances of the receptacle bore holes for the fuel injection valves on the cylinder head, as well as the receptacle elements for the fuel injection valves on the fuel distributor line. This problem is aggravated by the fact that the hold-down force exerted by the clamping claws does not act uniformly over the periphery of the fuel injection valves installed in the receptacle bore holes on the cylinder head, but instead it acts only at points, which results in a slight tilting of the fuel injection valves in the receptacle bore holes. The resulting additional deviations in position and angle on the inlet sections of the fuel injection valves make the assembly of the fuel distributor line even more difficult. The O ring arranged between the inlet section of the fuel injection valve and the receptacle element of the fuel distributor line compensates for the deviations in position and angle only to a very slight and inadequate extent. The deviations in position and angle that occur in practice with the fuel injection system described in Japanese Patent Application No. 08-312503, also result in a risk of fuel leaking from the seal, which does not compensate for the deviations in position and angle, in addition to the disadvantage of difficult assembly.

German Patent Application No. 29 08 095 describes that a fuel injection valve which is not provided for direct injection of fuel can be secured on a fuel distributor line by a retaining strap, and the inlet section of the fuel injection valve can be inserted into the fuel distributor line by a plug-in nipple. This assembly arrangement does not provide for compensation of deviations in position and angle at the connection of the fuel injection valve with the fuel distributor line, nor is it necessary, because the fuel injection valve is not secured rigidly in the receptacle bore hole of the intake pipe in contrast with the assembly of a directly injecting fuel injection valve on the cylinder head, but instead it is freely movable on a sealing element provided in the receptacle bore hole of the intake pipe.

European Patent Application No. 0 491 582 describes that the fuel injection valves on the fuel distributor line can be preassembled on the fuel distributor line before being inserted into the receptacle orifices. However, this conventional fuel injection system is also unsuitable for direct injection of fuel into the combustion chamber of the internal combustion engine, but it is instead intended for indirect injection of fuel into the intake pipe of the internal combustion engine, so that no special requirements have to be set for the position and angle tolerances of the preassembled fuel injection valves.

SUMMARY OF THE INVENTION

A fuel injection system according to the present invention has the advantage that deviations in position and angle which occur due to manufacturing tolerances and assembly-related tolerances are reliably compensated. Therefore, the assembly of the fuel injection system, in particular the fuel distributor line, is greatly facilitated. This prevents warping of the fuel injection valves or the fuel distributor line as can occur with a connection that does not compensate for deviations in position and angle. Furthermore, there are no sealing problems between the fuel distributor line and the inlet sections of the fuel injector valves, because the sealing elements are not deformed unilaterally due to uncompensated deviations in position and angle. Conversely, the fuel injection system refined according to the present invention permits greater tolerances in the manufacture of the cylinder head and the fuel distributor line, thereby reducing the manufacturing complexity of these parts and thus reducing manufacturing costs accordingly. The fuel distributor line can be installed relatively close to the cylinder head, so only a small space is needed.

The connecting area between the fuel distributor line and the inlet section of the fuel injection valves may be designed with a relatively large cross section, so there is no drop in pressure when the fuel injection valves are opened.

When using sleeve-shaped securing elements which can be connected to the fuel distributor line and the transition pieces, preferably by a snap catch connection, there is the possibility of preassembly of the transition pieces on the fuel distributor line for a fuel injection system according to one embodiment of the present invention. The fuel distributor line can be removed from the fuel injection valves for maintenance purposes in dismantling together with the transition pieces which are secured on the fuel distributor line by the securing elements. Furthermore, it is advantageous if the transition piece is designed with such a large diameter that a fuel reservoir which compensates for pressure fluctuations is formed upstream from the fuel inlet opening of the respective fuel injection valve. This prevents a pressure drop when opening the fuel injection valve, because the fuel reservoir in the transition piece acts as a buffer storage and also permits unthrottled inflow of fuel from the fuel distributor line to the fuel inlet opening of the respective fuel injection valve.

With a fuel injection system according to another embodiment of the present invention, it is advantageous if the midpoint in the curvature of the cup-shaped supporting face is in the area of a sealing element on which the spray section of the fuel injection valve inserted into the receptacle bore hole is pivotably mounted. This guarantees that the supporting section provided on the fuel injection valve is in complete contact with the cup-shaped supporting face in each swivel position of the fuel injection valve. The cup-shaped supporting face can be advantageously formed on a supporting body which can be inserted into the receptacle bore hole of the cylinder head. This makes it possible to simplify manufacture by designing the supporting body as a separate part, in particular as a separately manufactured turned part, and is manufactured independently of the cylinder head.

DETAILED DESCRIPTION

Figure 1:
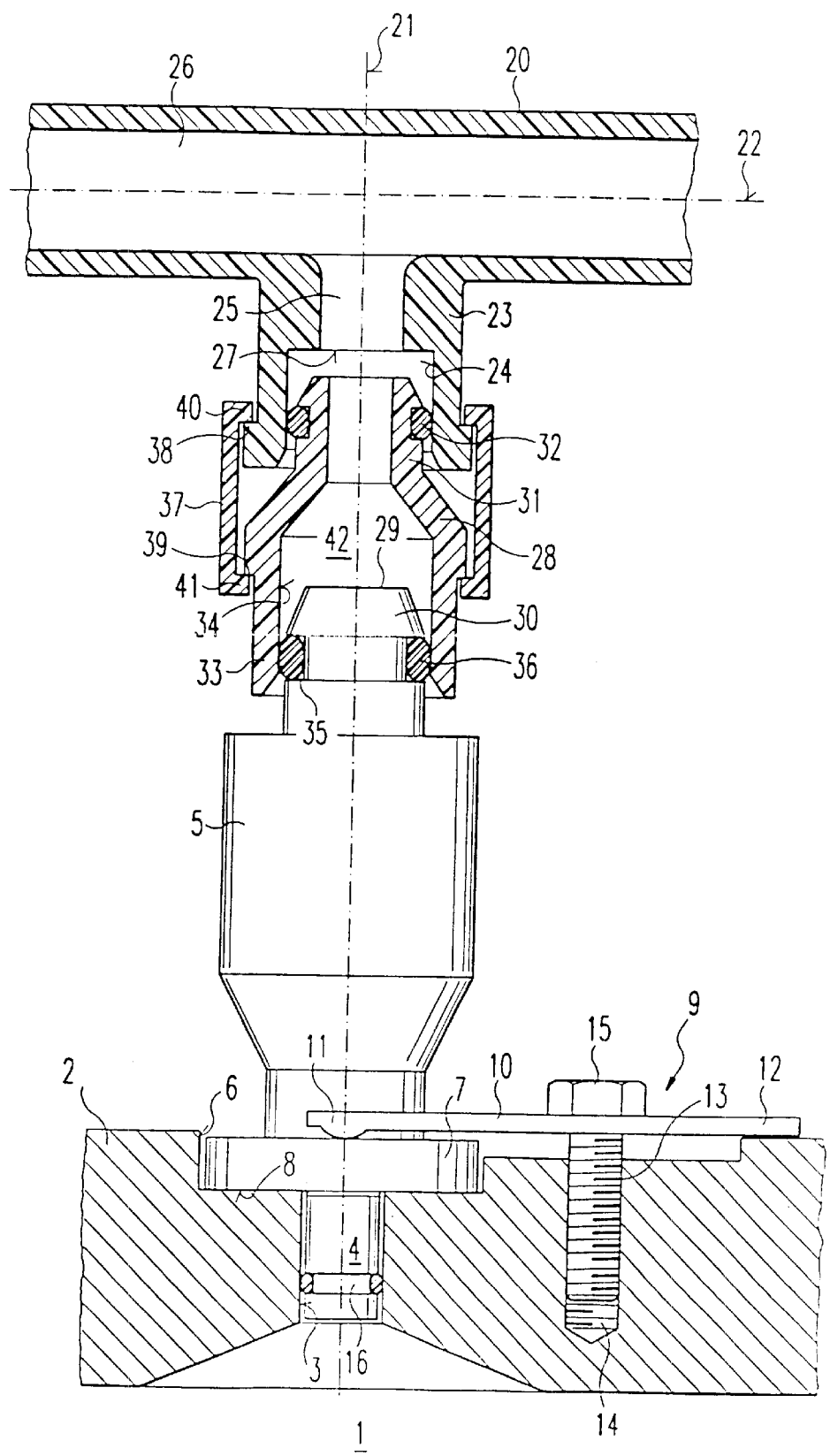
FIG. 1 shows a partially cutaway view of a first embodiment of a fuel injection system according to the present invention.

FIG. 1 shows a first embodiment of a fuel injection system according to the present invention in a diagram showing only a detail in a partially cutaway view.

The fuel injection system according to the present invention serves for direct injection of fuel into at least one combustion chamber, but typically several, e.g. four combustion chambers of an internal combustion engine. The detail of a diagram in FIG. 1 shows only one combustion chamber 1 of the internal combustion engine which is sealed by a cylinder head 2. Cylinder head 2 has a receptacle bore hole 3 into which a spray section 4 of a fuel injection valve 5 can be inserted. At least one fuel injection valve 5 is provided for each combustion chamber 1 of the internal combustion engine. Receptacle bore hole 3 is sealed from the combustion gases of combustion chamber 1 by a ring gasket 16. On the side facing away from combustion chamber 1, receptacle bore hole 3 is followed by a recess 6 provided in cylinder head 2 to receive a flange 7 of fuel injection valve 5 inserted into receptacle bore hole 3.

In the embodiment illustrated in FIG. 1, flange 7 rests on a flat supporting face 8 of cylinder head 2 and is pressed against supporting face 8 of cylinder head 2 by a hold-down device designed as clamping claw 9 in the embodiment. The hold-down force exerted by clamping claw 9 is greater than the opposing force exerted by the combustion pressure of the combustion gases in combustion chamber 1, so that spray section 4 of fuel injection valve 5 is secured reliably on cylinder head 2 even at a high combustion pressure.

Clamping claw 9 has a tension lever 10 resting on a supporting section 11 on flange 7 of fuel injection valve 5. Tension lever 10 may extend around fuel injection valve 5 like a fork, so that another supporting section rests on flange 7 on the rear side of fuel injection valve 5 in FIG. 1. On its end 12 opposite supporting section(s) 11, tension lever 10 rests on cylinder head 2 and can be prestressed against cylinder head 2 by a tension screw 13 which can be screwed into a threaded bore hole 14 in cylinder head 2. A suitable tool such as a wrench can be used on a screw head 15 having a hexagonal shape, for example, in assembling fuel injection valve 5 on tension screw 13.

A fuel distributor line 20 is provided to supply fuel injection valve 5 shown in FIG. 1 and the other fuel injection valves (not shown in FIG. 1) which serve to directly inject fuel into the other combustion chambers (also not shown in FIG. 1) of the internal combustion engine. Fuel distributor line 20 is tubular and extends along an axis 22 running perpendicular to longitudinal axis 21 of fuel injection valve 5 and receptacle bore hole 3 of cylinder head 2. Fuel distributor line 20 is connected to all fuel injection valves 5 of the fuel injection system and has a pipe coupling 23 at the position of each fuel injection valve 5, the coupling being designed in the form of a stepped hollow cylinder and having a guide section 24 connected to main channel 26 of fuel distributor line 20 by a connecting channel 25.

In the area of each pipe coupling 23, fuel distributor line 20 has a fuel outlet opening 27 for each fuel injection valve 5.

A transition piece 28 according to the present invention is connected downstream to fuel outlet opening 27 of fuel distributor line 20, supplying fuel to a fuel inlet opening 29 on an admission section 30 of fuel injection valve 5. In the embodiment illustrated in FIG. 1, transition piece 28 has an upstream tapered section 31 which can be inserted into guide section 24 of pipe coupling 23 and is sealed with respect to pipe coupling 23 of fuel distributor line 20 by a first sealing element 32 designed as an O ring. Upstream section 31 of transition piece 28 is slidingly displaceable in guide section 24 of pipe coupling 23 by the fact that first sealing element 32 slides along the inside wall of guide section 24. Furthermore, transition piece 28 can be pivoted with respect to pipe coupling 23 within predetermined limits, first sealing element 32 equalizing the variable gap spacing between upstream section 31 of transition piece 28 and guide section 24 of pipe coupling 23, which varies in pivoting.

Transition piece 28 also has a downstream section 33 on whose inside diameter there is a guide section 34 for inlet section 30 of fuel injection valve 5. Inlet section 30 has a groove 35 for a sealing element which is designed as O ring 36 in this embodiment and seals the gap spacing between downstream section 33 and inlet section 30 of fuel injection valve 5. Inlet section 30 is also slidingly displaceable in guide section 34 since sealing element 36 slides along the inside wall of downstream section 33 of transition piece 28. Furthermore, inlet section 30 is pivotable with respect to transition piece 28 in predetermined limits, so sealing element 36 is slightly deformed in pivoting and accordingly equalizes the change in gap spacing between downstream section 33 of transition piece 28 and inlet section 30 of fuel injection valve 5.

Due to the displaceable and pivotable arrangement of transition piece 28 on pipe coupling 23 on the one hand and the displaceable and pivotable arrangement of inlet section 30 of fuel injection valve 5 on transition piece 28 on the other hand, an articulately bendable, extendable and shortenable telescoping connection is achieved between fuel distributor line 20 and fuel injection valve 5, making it possible to install fuel distributor line 20 on fuel injection valves 5 with a high degree of flexibility. An angle or position offset of inlet section 30 due to manufacturing or assembly tolerances can be compensated to a great extent by the flexible connection by using transition piece 28 without deforming sealing elements 32 and 36 to the extent that leakage problems occur at sealing elements 32 and 36.

The inside diameter of guide section 24 of pipe coupling 23 preferably corresponds essentially to the inside diameter of guide section 34 of transition piece 28. This prevents a force component from acting on transition piece 28 in the direction of longitudinal axis 21 due to the fuel pressure, which could lead to unwanted displacement of transition piece 28.

Transition piece 28 can be secured by a securing element 37 on respective pipe coupling 23. Transition piece 28 can therefore be preinstalled on fuel distributor line 20, which facilitates assembly. Furthermore, this ensures that transition piece 28 will adhere to pipe coupling 23 when fuel distributor line 20 is pulled off, and that the connection between transition piece 28 and inlet section 30 of fuel injection valve 5 will be released instead of the connection between transition piece 28 and pipe coupling 23. This guarantees that transition piece 28 will not be pulled out of pipe coupling 23 in assembly and dismantling and possibly lost. Securing element 37 has a sleeve shape in this embodiment, surrounding a downstream area of pipe coupling 23 and an upstream area of transition piece 28 with a ring shape. Pipe coupling 23 may have a first catch nose 38, and transition piece 28 may have a second catch nose 39, interacting with a first inside projecting edge 40 and a second inside projecting edge 41 of securing element 37 to form two catch connections.

Fuel distributor line 20, transition pieces 28 and securing elements 37 may be manufactured inexpensively from a suitable plastic material by a plastic injection molding method, for example.

Each transition piece 28 may be designed with a large enough inside diameter so that transition piece 28 forms a fuel reservoir 42 that compensates for pressure fluctuations upstream from fuel inlet opening 29 in fuel injection valve 5.

Furthermore, the relatively large inside diameter of transition piece 28 permits an unthrottled inflow of fuel from fuel outlet opening 27 of fuel distributor line 20 to fuel inlet opening 29 of fuel injection valve 5.

Figure 2:
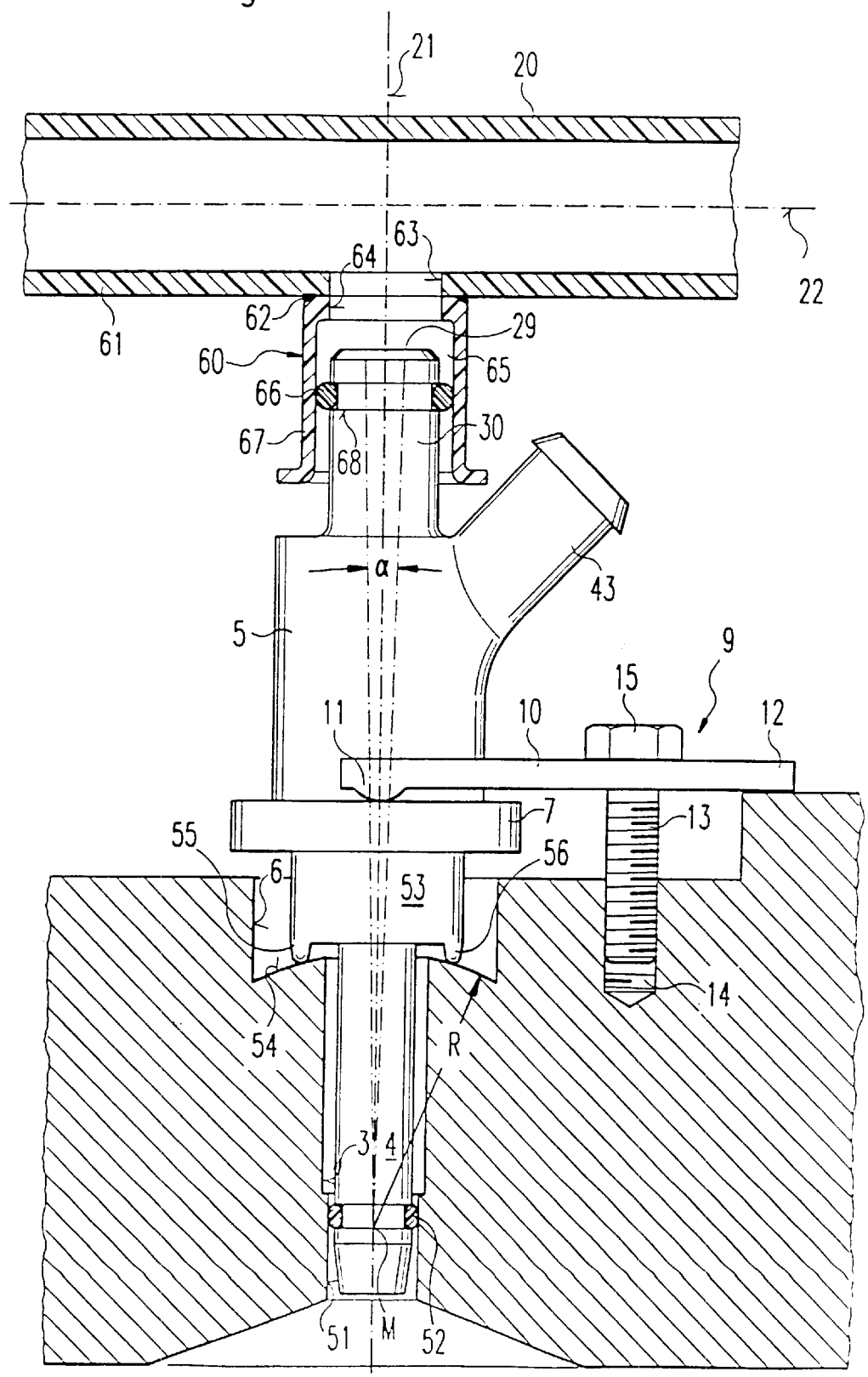
FIG. 2 shows a partially cutaway view of a second embodiment of the fuel injection system according to the present invention.

FIG. 2 shows a detail of another embodiment of a fuel injection system according to the present invention in a partially cutaway diagram.

Elements already described with reference to FIG. 1 are labeled with the same reference notation here, so that no repetitive description is needed in this regard. FIG. 2 also shows a plug connector 43 for electrical contacting of fuel injection valve 5, but it does not have any particular relevance within the context of the present invention.

As also shown in the embodiment in FIG. 1, cylinder head 2 has a receptacle bore hole 3 opening into the respective combustion chamber 1 to receive spray section 4 of fuel injection valve 5. Receptacle bore hole 3 is designed as a stepped bore hole in the embodiment illustrated in FIG. 2 and has a tapered section 51 which is in sealing contact with a first sealing element 52 and seals spray section 4 with respect to cylinder head 2. Fuel injection valve 5 is pivotably mounted on first sealing element 52, which is designed as an O ring in this embodiment, so that it can pivot slightly in angle range a within predetermined limits.

To guarantee that a supporting section 53 of fuel injection valve 5 will be supported on a supporting face 54 of cylinder head 2 in all pivoting positions, supporting face 54 is designed in the form of a partial spherical face. Supporting face 54 surrounds receptacle bore hole 3 concentrically. Radius of curvature R of supporting face 54 is designed so that midpoint M of curvature of partial spherical cup-shaped supporting face 54 is located in the area of first sealing element 52, as illustrated in FIG. 2. In this embodiment, supporting section 53 of fuel injection valve 5 has several connection pieces 55, 56 on the spray end, arranged in a ring on supporting section 53. As an alternative, a single ring-shaped connection piece or multiple partial ring-shaped connection pieces may be used. In addition, as an alternative, the spray-side face of supporting section 53 may have a concave cup-shaped recess whose radius of curvature matches that of the convex, partial spherical cup-shaped supporting face 54. With the latter alternative, better thermal coupling between fuel injection valve 5 and cylinder head 2 is achieved. Each of the above described alternatives guarantee that supporting section 53 can be brought into form-fitting contact with supporting face 54 in all swivel positions of fuel injection valve 5.

With the arrangement described above, swiveling of fuel injection valve 5 with respect to longitudinal axis 21 is made possible within angle range a, and a sufficient hold-down force can be applied by clamping claw 9 to fuel injection valve 5 in the entire swivel range.

Inlet section 30 of fuel injection valve 5 can be inserted into a cup-shaped receptacle element 60. Receptacle element 60 may be designed either in one piece with main body 61 of fuel distributor line 20 or it may be connected to main body 61 of fuel distributor line 20 by a weld 62, as in the embodiment shown in FIG. 2. For each fuel injection valve 5, fuel distributor line 20 has a fuel outlet opening 63 which is opposite a corresponding opening 64 provided in receptacle element 60. Interior 65 of the receptacle element is sealed by a second sealing element 66 provided on inlet section 30 of fuel injection valve 5. Inlet section 30 is displaceable in receptacle element 60, since second sealing element 66, designed as an O ring, can slide along wall 67 of receptacle element 60. Second sealing element 66 is locked on inlet section 30 of fuel injection valve 5 by a groove 68. Inlet section 30 is accommodated by receptacle element 60 so that fuel injection valve 5 is secured so it can pivot within predetermined limits in receptacle element 60.

The arrangement of fuel injection valve 5 so that it can be pivoted within predetermined limits in receptacle opening 3 on cylinder head 2 on the one hand and receptacle element 60 of fuel distributor line 20 on the other hand permits reliable compensation of offset angles or positions due to manufacturing tolerances or assembly tolerances.

In assembling the fuel injection system according to the present invention, it is preferable to proceed so that all fuel injection valves 5 are first inserted into corresponding receptacle bore holes 3 on cylinder heads 2 without tightening tension screws 13 of clamping claws 9. Fuel injection valves 5 can still pivot within angle range α in this assembled state. Then fuel distributor line 20 is attached to all fuel injection valves 5 by inserting inlet sections 30 of fuel injection valves 5 into receptacle elements 60. Only relatively minor demands then need be made of the manufacturing tolerances for positioning receptacle bore holes 3 on cylinder head 2 and receptacle elements 60 on fuel distributor line 20, because, as mentioned previously, a position offset or angle offset is compensated within predetermined limits by the refinement according to the present invention. After assembling fuel distributor line 20 on all fuel injection valves 5, tension screws 13 of clamping claws 9 can be tightened so that fuel injection valves 5 are finally rigidly secured on cylinder heads 2.

Figure 3:
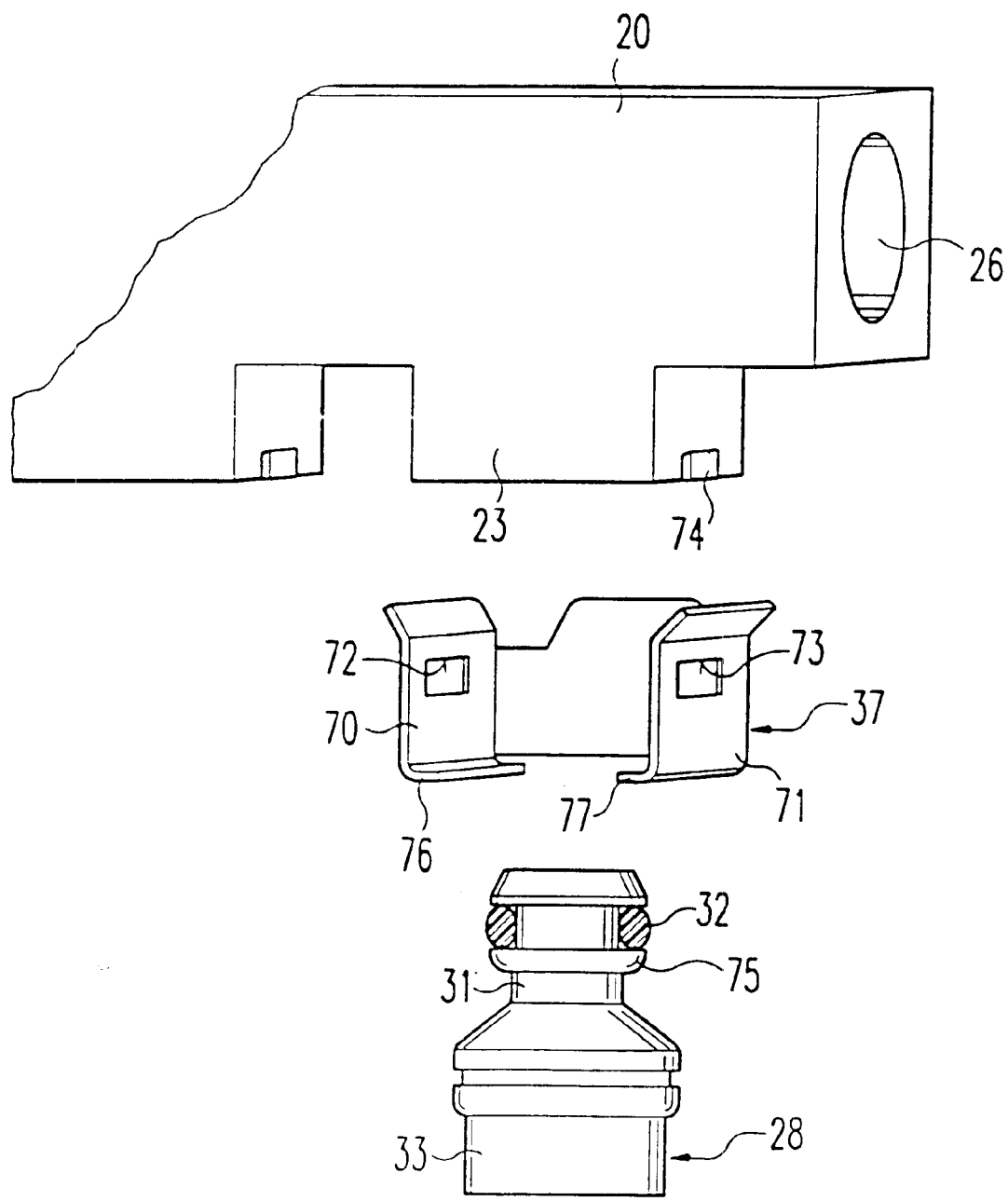
FIG. 3 shows a prospective view of a third embodiment of the fuel injection system according to the present invention.

FIG. 3 shows another embodiment of a fuel injection system according to the present invention in a perspective view. The basic concept of this embodiment corresponds to that of the embodiment described above with reference to FIG. 1. The particulars are derived especially from the design of securing element 37 and its catch connections with fuel distributor line 20 and transition piece 28. Elements already described with reference to FIG. 1 are shown with the same reference numbers here to facilitate understanding. Therefore, these need not be described again here.

Securing element 37 is essentially U-shaped and designed as a clamp in the embodiment illustrated in FIG. 3. A recess 72 and 73 is provided on each leg section 70 and 71 of securing element 37, so a catch nose 74 provided on pipe couplings 23 of fuel distributor line 20 engages in each recess. This provides the snap catch connection to fuel distributor line 20.

Transition piece 28 has a bulge 75 downstream from sealing element 32. Each of the two leg sections 70 and 71 of securing element 37 has an edge 76 or 77 projecting inward on their downstream end, extending around bulge 75 and engaging it when securing element 37 is joined to transition piece 28. This implements the snap catch connection between securing element 37 and transition piece 28.

Figure 4:
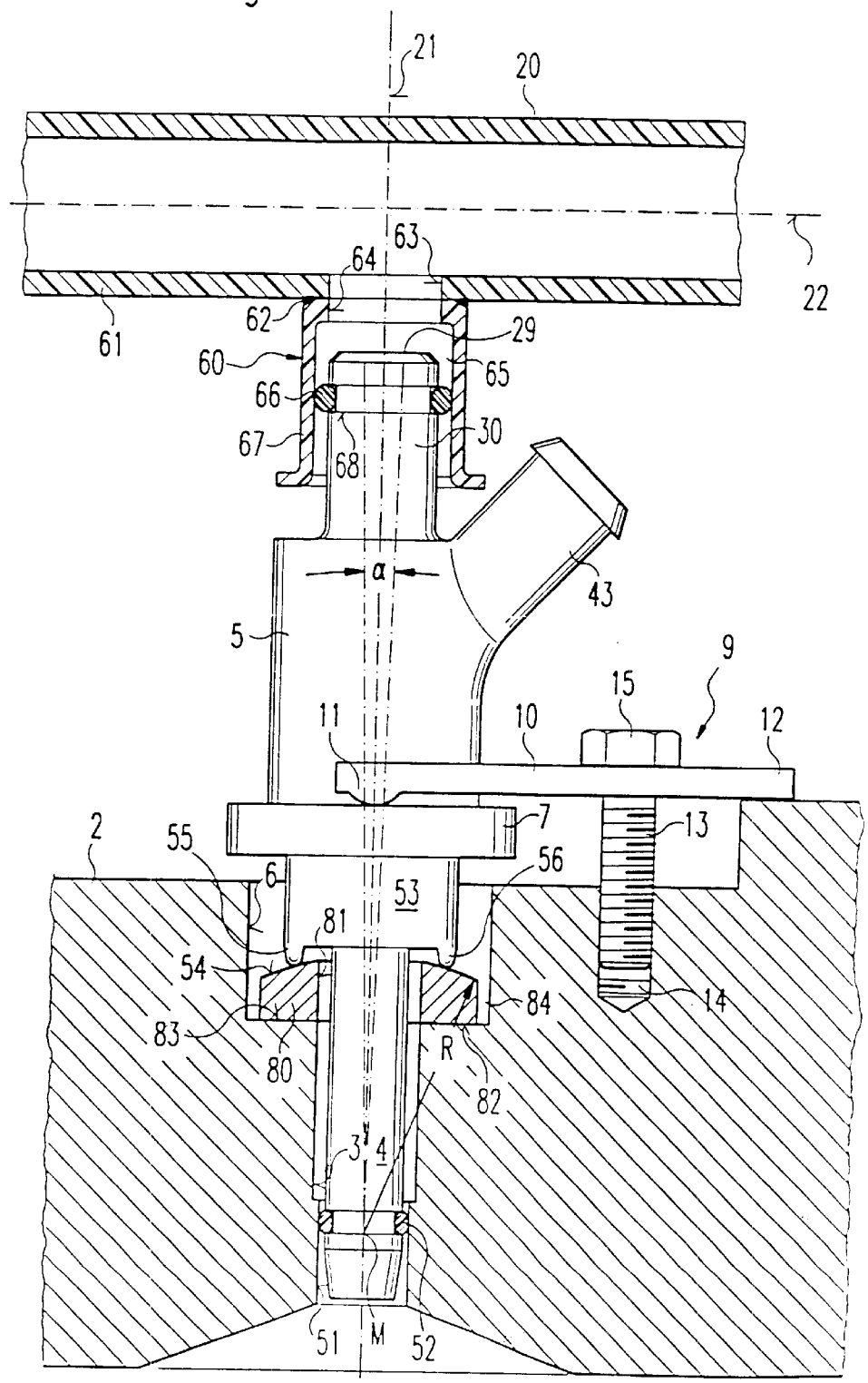
FIG. 4 shows a partially cutaway view of a fourth embodiment of the fuel injection system according to the present invention.

FIG. 4 shows a fourth embodiment of the fuel injection system according to the present invention in a partially cutaway diagram. The basic concept of this embodiment is similar to one shown in FIG. 2. Elements that have already been described are therefore provided with the same reference numbers, so the following description can be limited to the differences in the embodiment shown in FIG. 4 in comparison with the embodiment illustrated in FIG. 2.

In the embodiment illustrated in FIG. 4, supporting face 54 is not formed directly on cylinder head 2, but instead it is provided on a separate supporting body 80. Supporting body 80 can be inserted into receptacle bore hole 3 of cylinder head 2. In the embodiment shown in FIG. 4, supporting body 80 is toroidal in shape and has a bore bore hole 81 into which spray section 4 of fuel injection valve 5 can be inserted, so that, when assembled, toroidal supporting body 80 surrounds spray section 4 of fuel injection valve 5. Supporting body 80 is preferably designed to be flat on its surface 82 opposite supporting face 54, so that surface 82 of supporting body 80 is in plane-parallel contact with a surface 83 of cylinder head 2 which is also flat. The diameter of supporting body 80 may be essentially identical to the diameter of recess 6 in cylinder head 2. In the embodiment shown here, however, the outside diameter of toroidal supporting body 80 is slightly smaller than the inside diameter of recess 6, thus resulting in a peripheral annular gap 84. Annular gap 84 improves the compensation of tolerance, so that lower demands can be made of the precision in manufacturing. Supporting body 80 is kept in contact with recess 6 in cylinder head 2 by the hold-down force exerted by clamping claw 9 and is thereby secured against slipping. In addition, supporting body 80 can be joined to cylinder head 2 by welding, screwing, gluing or the like. With the embodiment illustrated in FIG. 4, supporting face 54 also surrounds receptacle bore hole 3 concentrically. Radius R of curvature of supporting face 54 is designed so that midpoint M of curvature of partial spherical cup-shaped supported face 54 is located in the area of first sealing element 52.

The embodiment according to the present invention improves the ease of assembly of the fuel injection system. Since demands regarding manufacturing tolerances can be reduced in comparison with a conventional design, this also yields reduced manufacturing costs for cylinder head 2 and fuel distributor line 20.

What is claimed is:

1. A fuel injection system for directly injecting fuel into at least one combustion chamber of an internal combustion engine, the internal combustion engine including a cylinder head, the fuel injection system comprising:
   at least one fuel injection valve cooperating with the at least one combustion chamber and including:
      a spray section for inserting into a receptacle bore hole in the cylinder head, and
      an inlet section having a fuel inlet opening;
   a fuel distributor line having a fuel outlet opening for the at least one fuel injection valve, the fuel distributor line being connectable to the fuel inlet opening of the at least one fuel injection valve; and
   a tubular transition member situated between the fuel inlet opening of the at least one fuel injection valve and the fuel outlet opening of the fuel distributor line, the tubular transition member being sealingly connected to the fuel inlet-opening and the fuel outlet opening so as to enable a pivoting movement of the tubular transition member with respect to the fuel inlet opening and the fuel outlet opening within predetermined limits,
      wherein the inlet section of the at least one fuel injection valve is flexibly situated on the fuel distributor line via the tubular transition member.

2. A fuel injection system for directly injecting fuel into at least one combustion chamber of an internal combustion engine, the internal combustion engine including a cylinder head, the fuel injection system comprising:
   at least one fuel injection valve cooperating with the at least one combustion chamber and including:
      a spray section for inserting into a receptacle bore hole in the cylinder head, and
      an inlet section having a fuel inlet opening;
   a fuel distributor line having a fuel outlet opening for the at least one fuel injection valve, the fuel distributor line being connectable to the fuel inlet opening of the at least one fuel injection valve; and
   a tubular transition member situated between the fuel inlet opening of the at least one fuel injection valve and the fuel outlet opening of the fuel distributor line, the tubular transition member being sealingly connected to the fuel inlet opening and the fuel outlet opening so as to enable a movement of the tubular transition member within predetermined limits,
      wherein the inlet section of the at least one fuel injection valve is flexibly situated on the fuel distributor line via the tubular transition member,
      wherein the fuel distributor line includes a pipe coupling for cooperating with the at least one fuel injection valve in an area of the fuel outlet opening, and
      wherein the tubular transition member includes a sealing element which is slidably displaceable in a guide section of the pipe coupling.

3. The fuel injection system according to claim 2, wherein the tubular transition member is mounted on the sealing element to pivot the tubular transition member within the predetermined limits.

4. The fuel injection system according to claim 2, wherein the pipe coupling surrounds an upstream section of the tubular transition member in a ring-like manner.

5. A fuel injection system for directly injecting fuel into at least one combustion chamber of an internal combustion engine, the internal combustion engine including a cylinder head, the fuel injection system comprising:
- at least one fuel injection valve cooperating with the at least one combustion chamber and including:
  - a spray section for inserting into a receptacle bore hole in the cylinder head, and
  - an inlet section having a fuel inlet opening;
- a fuel distributor line having a fuel outlet opening for the at least one fuel injection valve, the fuel distributor line being connectable to the fuel inlet opening of the at least one fuel injection valve;
- a tubular transition member situated between the fuel inlet opening of the at least one fuel injection valve and the fuel outlet opening of the fuel distributor line, the tubular transition member being sealingly connected to the fuel inlet opening and the fuel outlet opening so as to enable a movement of the tubular transition member within predetermined limits; and
- a sleeve-shaped securing element securing the tubular transition member on the fuel distributor line,
  - wherein the inlet section of the at least one fuel injection valve is flexibly situated on the fuel distributor line via the tubular transition member.

6. The fuel injection system according to claim 5, wherein the sleeve-shaped securing element includes a catch connector for connecting the sleeve-shaped securing element to at least one of the fuel distributor line and the tubular transition member using a snap catch action.

7. A fuel injection system for directly injecting fuel into at least one combustion chamber of an internal combustion engine, the internal combustion engine including a cylinder head, the fuel injection system comprising:
- at least one fuel injection valve cooperating with the at least one combustion chamber and including:
  - a spray section for inserting into a receptacle bore hole in the cylinder head, and
  - an inlet section having a fuel inlet opening;
- a fuel distributor line having a fuel outlet opening for the at least one fuel injection valve, the fuel distributor line being connectable to the fuel inlet opening of the at least one fuel injection valve; and
- a tubular transition member situated between the fuel inlet opening of the at least one fuel injection valve and the fuel outlet opening of the fuel distributor line, the tubular transition member being sealingly connected to the fuel inlet opening and the fuel outlet opening so as to enable a movement of the tubular transition member within predetermined limits,
  - wherein the inlet section of the at least one fuel injection valve is flexibly situated on the fuel distributor line via the tubular transition member, and
  - wherein the inlet section of the at least one fuel injection valve includes a sealing element which is slidably displaceable in a guide section of the tubular transition member.

8. The fuel injection system according to claim 7, wherein the inlet section of the at least one fuel injection valve is mounted on the sealing element for enabling the at least one fuel injection valve to pivot within the predetermined limits.

9. The fuel injection system according to claim 2, wherein the tubular transition member includes a downstream section which surrounds the inlet section of the at least one fuel injection valve in a ring-like manner.

10. The fuel injection system according to claim 2, wherein the tubular transition member has an inside diameter for forming a fuel reservoir in the tubular transition member, the fuel reservoir equalizing pressure fluctuations upstream from the fuel inlet opening of the at least one fuel injection valve.

11. The fuel injection system according to claim 2, further comprising:
- at least one hold-down device for securing the at least one fuel injection valve in the receptacle bore hole against a combustion pressure which is present in the at least one combustion chamber.

12. A fuel injection system for directly injecting fuel into at least one combustion chamber of an internal combustion engine, the internal combustion engine including a cylinder head, the fuel injection system comprising:
- at least one fuel injection valve cooperating with the at least one combustion chamber and including:
  - a spray section for inserting into a receptacle bore hole in the cylinder head, and
  - an inlet section having a fuel inlet opening;
- a fuel distributor line having a fuel outlet opening for the at least one fuel injection valve, the fuel distributor line being connectable to the fuel inlet opening of the at least one fuel injection valve; and
- a tubular transition member situated between the fuel inlet opening of the at least one fuel injection valve and the fuel outlet opening of the fuel distributor line, the tubular transition member being sealingly connected to the fuel inlet opening and the fuel outlet opening so as to enable a slidingly displaceable movement of the tubular transition member with respect to the fuel inlet opening and the fuel outlet opening within predetermined limits,
  - wherein the inlet section of the at least one fuel injection valve is flexibly situated on the fuel distributor line via the tubular transition member.

* * * * *

UNITED STATES PATENT AND TRADEMARK OFFICE
CERTIFICATE OF CORRECTION

PATENT NO. : 6,431,151 B1
DATED : August 13, 2002
INVENTOR(S) : Karl Gmelin

It is certified that error appears in the above-identified patent and that said Letters Patent is hereby corrected as shown below:

<u>Title page,</u>
Item [57], ABSTRACT, change "snarlingly" to -- slidingly --

<u>Column 6,</u>
Line 7, change "cup-shaped" to -- cap-shaped --
Line 17, change "cup-shaped" to --cap-shaped --

<u>Column 7,</u>
Line 66, change "cup-shaped" to -- cap-shaped --

Signed and Sealed this

Twentieth Day of April, 2004

JON W. DUDAS
*Acting Director of the United States Patent and Trademark Office*